J. W. COLLINS.
Combined Calendar and Clamp.
No. 8,974. Reissued Nov. 18, 1879.
— FIG. I. —
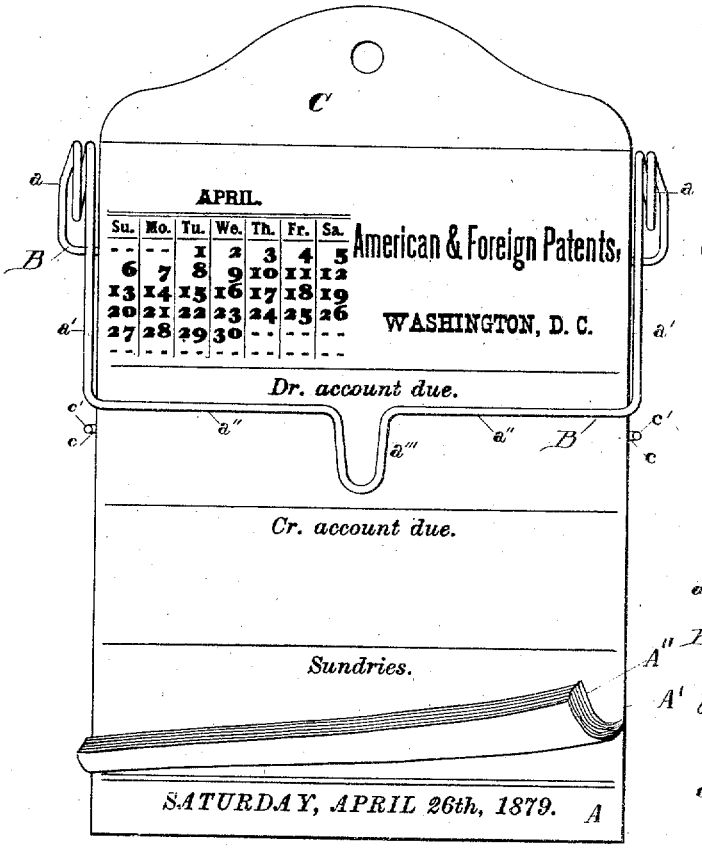
— FIG. II. —
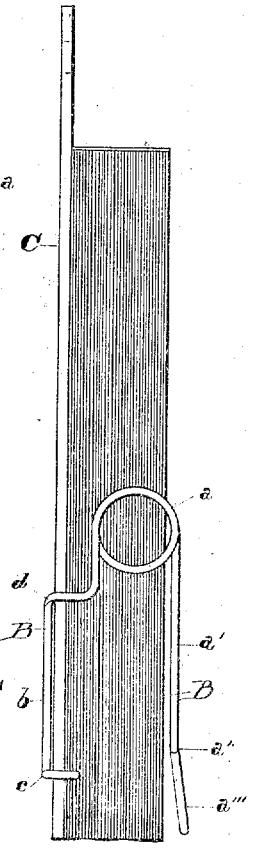
— WITNESSES. —
Geo. A. Boydell,
D. P. Cawl
— INVENTOR. —
John W. Collins
by U. H. W. T. Mann
Attys.

J. W. COLLINS.
Combined Calendar and Clamp.
No. 8,974. Reissued Nov. 18, 1879.
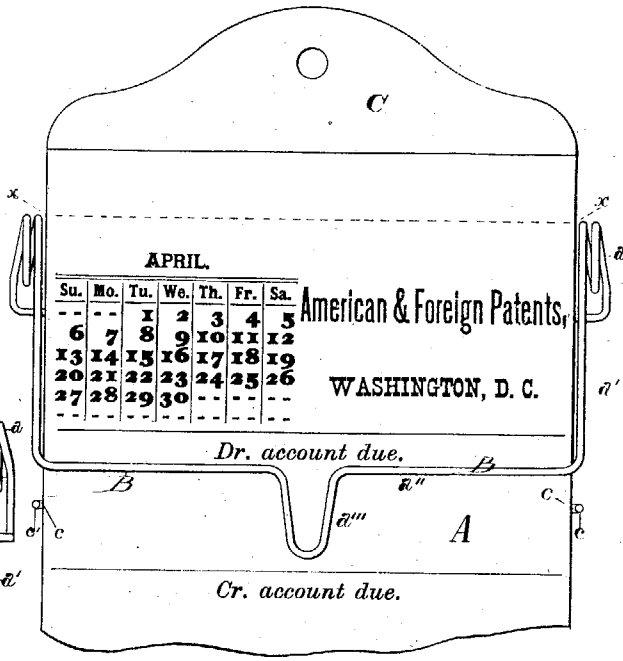
FIG. IX.
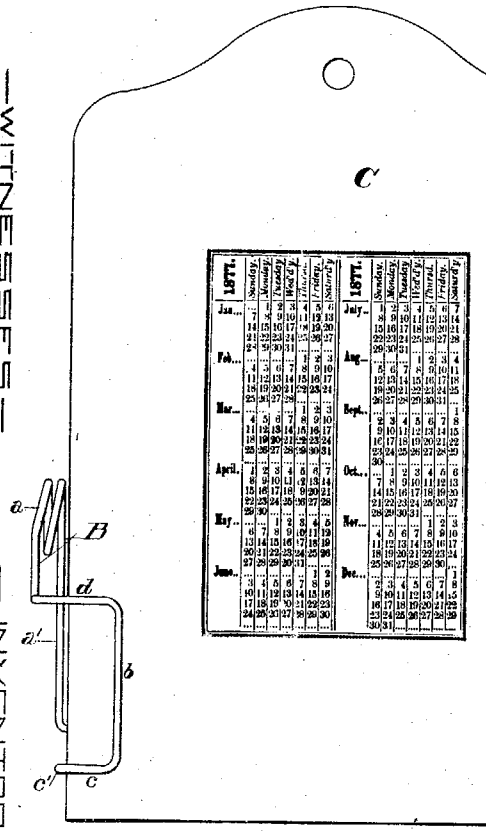
FIG. III.
WITNESSES.
Geo. A. Boydell
D. P. Cowl
INVENTOR.
John W. Collins
by M. H. W. Howard
atty.

UNITED STATES PATENT OFFICE.

JOHN W. COLLINS, OF BALTIMORE, MARYLAND.

IMPROVEMENT IN COMBINED CALENDAR AND CLAMP.

Specification forming part of Letters Patent No. 199,796, dated January 29, 1878; Reissue No. 8,974, dated November 18, 1879; application filed October 7, 1879.

*To all whom it may concern:*

Be it known that I, JOHN W. COLLINS, of the city of Baltimore, in the State of Maryland, have invented certain Improvements in Counting-House Calendars, of which the following is a specification, reference being had to the accompanying drawings, and to the letters of reference marked thereon.

This invention consists, first, in a calendar formed of sheets of paper consecutively dated for the different days of the year at or near their bottoms, and having blank spaces for entries, memoranda, &c., the said sheets being joined together at their top edges in a manner enabling each sheet to be raised so that the under sheets can be seen or marked, and also to be detached from the rest for purposes hereinafter described. The sheets are preferably attached to a rigid back, and are also provided with suitable printed matter, indicating the uses to which the aforesaid blank spaces are to be applied, and may also carry advertisements; but these features, while in themselves important, are not claimed as parts of the invention, the essential points in this part of my invention consisting of a number of sheets designating the days of the year, secured together, so as to be capable of raising and separate detachment, and having blank spaces and dates at or near their bottoms.

The second part of my invention consists in combining with a calendar of the description herein set forth a spring-clamp for holding the sheets together and keeping them from flapping in the wind or becoming curled up at their free edges by constant use, action of heat or moisture, and other causes.

In the accompanying drawings, Figure I is a front view of the invention, showing the clamp moved up, and some of the front leaves elevated. Fig. II is an edge view of the same, showing the clamp moved down. Fig. III is a reverse view of the same, showing a yearly calendar attached to the back of the device. Fig. IV shows a convenient means for permitting the detachment of the sheets separately, there being a row of perforations at *x x*.

Similar letters of reference indicate similar parts of the invention in all the views.

The calendar-sheets shown by A A′ A″, &c., are caused to adhere to each other at their upper edges by mucilage or paste, or are attached in any other suitable way, which will admit of their being torn off one by one. Each sheet has the date of a day of the year at or near its bottom edge, as shown, the dates running back consecutively from January 1st to December 31st of a certain year.

While I prefer to make the calendar contain three hundred and sixty-five sheets, one having three hundred and thirteen sheets (those indicating the Sundays being omitted) might answer the purpose for which this device is particularly designed, viz., use in counting-houses; and a calendar having three hundred and thirteen consecutively-dated sheets provided with spaces for notes, I consider the equivalent of one having three hundred and sixty-five sheets.

There are here, preferably, three spaces left for memoranda, respectively headed "Dr. accounts due," "Cr. accounts due," and "Memoranda." The upper space is designed to receive notes ahead of bills or accounts payable; the center, of bills or accounts receivable; the bottom space to receive miscellaneous memoranda, such as appointments, business engagements, directors' meetings, &c. The notes can be made ahead by simply sliding up the clamp or binder B and raising the sheets, the required date being readily visible to the eye by being placed at the bottom of the sheet.

The upper left-hand corner of each sheet is provided with a calendar for the month. An advertisement also may occupy a portion of the upper part of each sheet, as shown, and the device is thus made a permanent advertising medium; but the monthly calendar and the advertisement may be omitted, or the number of spaces changed, or the headings of the spaces altered, without changing the nature of my invention, the essential features of which have been hereinbefore described.

The sheets are preferably mounted on a stiff back, C, which is provided with a hole for purposes of suspension; but the sheets could be suspended by other means without the use of the back. The clamp B is preferably formed of wire, bent into a form giving it elasticity, which exerts a force to compress the sheets, whether complete or reduced in number.

In an application now pending I have described and claimed a binder of the construction considered by me best adapted to the purpose, and therefore, in the present application, make no claim to the said binder in itself.

I am aware that it is not new to attach together sheets containing monthly calendars so that they can be torn off singly by a paper-tearer at the attaching-point; and also that the said monthly calendars have been and are marked at the bottom with the names of the months.

I am also aware that it is not new to use three hundred and sixty-five sheets of paper as a calendar, which sheets, however, cannot be raised, and do not bear spaces for noting ahead. Such devices, therefore, I do not claim; but, Having described my invention, I claim as new and wish to secure by Letters Patent of the United States—

1. A calendar formed of sheets of paper representing the days of the year, and consecutively dated for the said different days at or near the bottoms of the sheets, and having blank spaces for entries and memoranda, the said sheets being joined together by means substantially as described, thus allowing them to be raised by hand for noting ahead, and to be separately detached by tearing, substantially as specified.

2. A calendar consisting of sheets designating each day of the year, and constructed to be raised and separately detached, as described, combined with a clamping or binding device capable of being slid up when the sheets are to be raised, as set forth.

In testimony whereof I have hereto subscribed my name in the presence of two subscribing witnesses.

JOHN W. COLLINS.

Witnesses:
WM. T. HOWARD,
THOS. MURDOCH.